(12) United States Patent
Chikane et al.

(10) Patent No.: US 7,495,696 B2
(45) Date of Patent: Feb. 24, 2009

(54) WHITE BALANCE METHOD

(75) Inventors: Varsha Chikane, Taipei (TW);
Chiou-Shann Fuh, Taipei (TW); Albert Hsueh, Taipei (TW)

(73) Assignee: Arima Computer Corporation, Taipei (TW)

( * ) Notice: Subject to any disclaimer, the term of this patent is extended or adjusted under 35 U.S.C. 154(b) by 718 days.

(21) Appl. No.: 11/104,076

(22) Filed: Apr. 11, 2005

(65) Prior Publication Data
US 2006/0164521 A1    Jul. 27, 2006

(30) Foreign Application Priority Data
Jan. 27, 2005   (TW) ............... 94102549 A (51) Int. Cl.
*H04N 9/73* (2006.01)
(52) U.S. Cl. ................... 348/223.1; 348/280
(58) Field of Classification Search .............. 348/223.1; 358/516, 518, 522; 382/162, 163, 167, 168
See application file for complete search history.

(56) References Cited

U.S. PATENT DOCUMENTS 5,917,556 A    6/1999   Katayama
2001/0017940 A1*  8/2001   Kim et al. ................... 382/162
2005/0122408 A1    6/2005   Park et al.

FOREIGN PATENT DOCUMENTS

JP    2000201277 A    7/2000

OTHER PUBLICATIONS

Weng et al., A Novel Automatic White Balance Method For Digital Still Cameras, May 2005 IEEE, pp. 3801-3804.
Hu et al., A New Algorithm For Automatic White Balance With Priori, Dec. 2000, IEEE, pp. 109-112.
Liu et al., Automatic White Balance For Digital Still Camera, IEEE Transactions on Consumer Electronics, vol. 41, No. 3, Aug. 1995, pp. 460-466.
Chikane et al., Automatic White Balance For Digital Still Cameras, Journal of Information Science and Engineering, vol. 22, May 23, 2005, pp. 497-509.

* cited by examiner

*Primary Examiner*—Ngoc-Yen T Vu
*Assistant Examiner*—Joel Fosselman (57) ABSTRACT

A white balance method for an image formed by a digital still camera is provided. The white balance method comprises steps of: removing a color cast over a white object of the image; detecting a reference white point from the image by extracting an a pixel information of the white object; and adjusting a white balance of the white object by determining a scale factor based on the color cast and the pixel information.

5 Claims, 8 Drawing Sheets

Fig. 1

A: the deflected direction of high color temperature
B: the deflected direction of low color temperature

WHITE BALANCE METHOD

FIELD OF THE INVENTION

The present invention relates in general to a white balance method for digital still cameras, and more particularly, to an automatic method to improve the white balance for digital still cameras.

BACKGROUND OF THE INVENTION

In recent years, digital cameras has captured the market of cameras. Although the quality and the price are considered, consumers are more concerned about the quality of the pictures. White balance is one of the factors used to improve the quality of the pictures. The current white balance methods are incompetent to handle all possible situations in the captured scene.

Whenever a scene is captured by a digital camera, every pixel value of the recorded scene depends upon the three-sensor response which is affected by the illuminant of that scene. As an effect, a distinct color cast appears over the captured scene. Such an effect of the light source remaining on the recorded image is due to a color temperature of the corresponding light source. When a white object is illuminated with a low color temperature light source, the object in the captured image has a reddish color. Similarly, if the white object is illuminated with a high color temperature light source, the object in the captured image has a bluish color. For developing a new white balance algorithm, it is necessary to render the information about the illuminant of the scene.

The color difference caused by the "color constancy" of a human eye in different light sources can not be distinguished by the human vision. The Colors remain constant through recognition despite they are viewed under different light sources. The mechanism employed in a digital camera to compensate the color difference caused by various light sources is white balance.

Gray World Method (GWM)

Gray world assumption states that a given image with a sufficient amount of color variations is provided, then the average value of the RED, GREEN, and BLUE components of the image will be averaged into a common gray-value. By gray world method, the average reflectance value of every visible surfaces in all scenes are assumed to be gray so as to estimate the spectral distribution of the illuminants. This method is implemented by taking an image and scaling the red, green and blue color components of the image in order to maintain the assumption of the gray world method.

Perfect Reflector Method (PRM)

Perfect reflector method assumes that the RGB values of the "brightest" pixel in an image captured by a digital camera is taken to be the glossy or specular surface. For any white balancing algorithm, it is the most important to gather the information about all surfaces and the illuminant in the scene. PRM focuses on an item constructed by underlining the presence of "specularity" or the glossy surfaces in an image. The specularity is helpful to convey a good amount of the information about the illuminant. The specularities or glossy surfaces reflect the actual color of the light source as these specularities have constant reflectance functions over a wide range of wavelengths. By detecting the specularities, it is easy to find out the actual color of the light source and further to eliminate the influence of the illuminant in the scene. This method exploits the perfect reflector settings to correct the image. It also locates the reference white point by finding the pixel with the greatest luminance value and performs a white balance adjustment according to the reference white point.

FUZZY Rules Method (FRM)

In FRM (Y. C. Cheng, W. H. Chan, and Y. Q. Chen, "Automatic White Balance for Digital Still Camera," EEEE Transactions on Consumer Electronics, Volume 41, pp. 460-466, 1995), the image is converted from the RGB color space to the YCrCb color space so that the color's characteristics in the YCrCb color space for the white balance adjustment is presented. A image is divided into 8 segments by FRM to achieve a more precise white balance.

Figure 1:
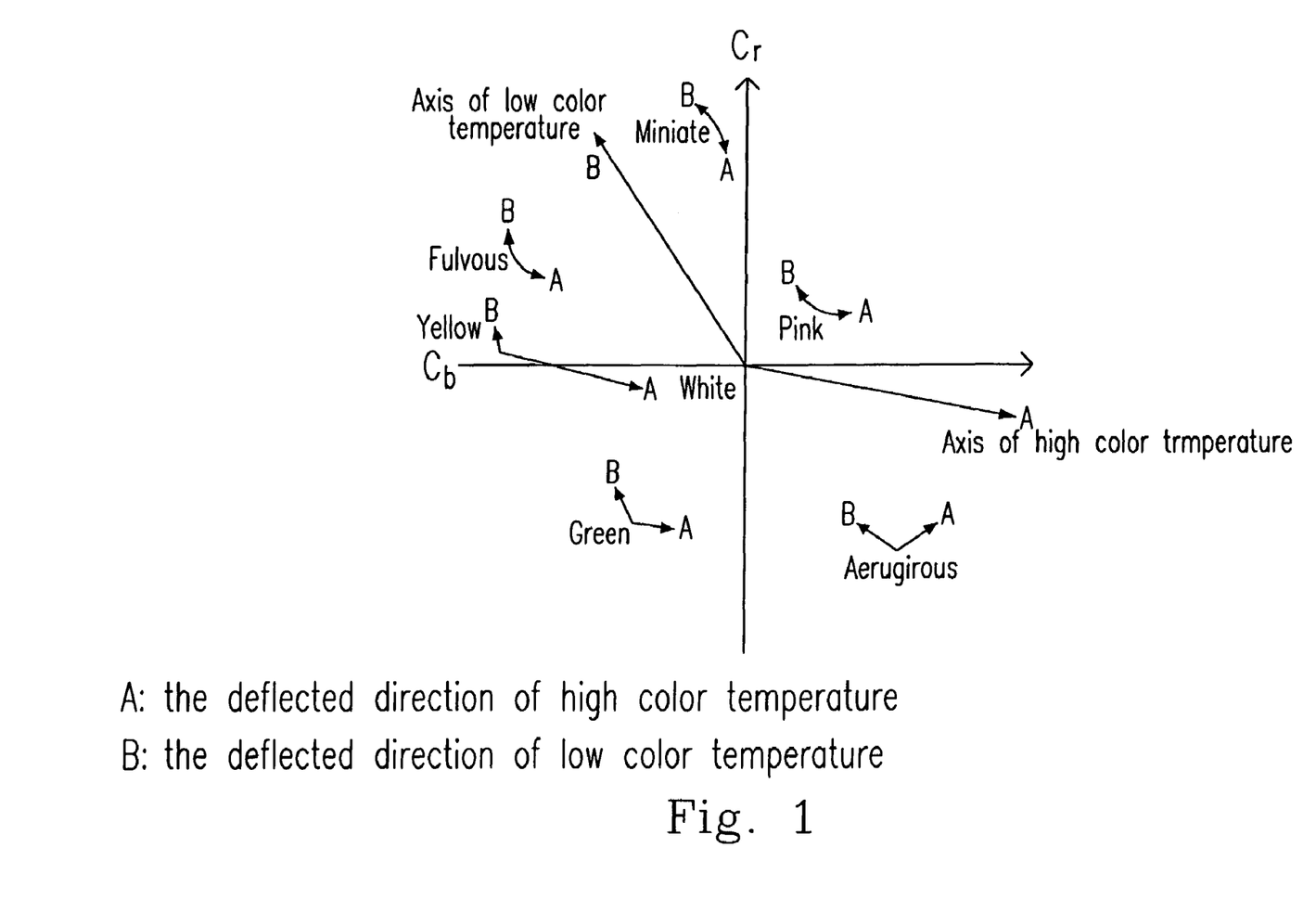
FIG. 1 is a diagram showing different deviations of the lights with different color temperatures.

Please refer to FIG. 1, which is a diagram showing different deviations of the lights with different color temperatures. In FIG. 1, "A" represents the deflected direction of the light with a higher color temperature, and "B" represents the deflected direction of the light with a lower color temperature. The experimental figure shows some results as follows:

(a) Compared to a brighter color, a darker color has a less deviation from nominal position under different light sources. The deviation is significant on Cr and Cb components.

(b) When a white color is illuminated with different light sources, the ratio of Cr to Cb will be approximately between −1.5 to −0.5.

(c) At high luminance, the color components are easy to be saturated; while at low luminance, the color components become colorless.

According to the above-mentioned experimental results, the fuzzy rules can be concluded as follows:

(i) The averages of Cr and Cb for each segment will be weighted with smaller values under the conditions of higher and lower illuminations in order to avoid being saturated and being colorless.

(ii) The averages of Cr and Cb for each segment of darker colors are weighted less than brighter colors.

(iii) When a large object or background occupies more than one segment, its color will dominate the segment. The Cr to Cb ratios of adjacent segments will be similar. The given weightings of those segments with a uniform chromatic color will become smaller in order to avoid over-compensation on the color of the image.

If the Cr to Cb ratio of the segment is approximately between −1.5 to −0.5, the probability of becoming a white region increases and the given weightings becomes the greatest.

Besides these basic methods, Chiou's white balance method (T. S. Chiou, "Automatic White Balance for Digital Still Camera," Master Thesis, Department of Computer Science and Information Engineering, National Taiwan University, Taiwan, 2000) has also been provided. In his method, Chiou tries to overcome the drawbacks of the basic methods.

Chiou's White Balance Method (CWBM)

Figure 2:
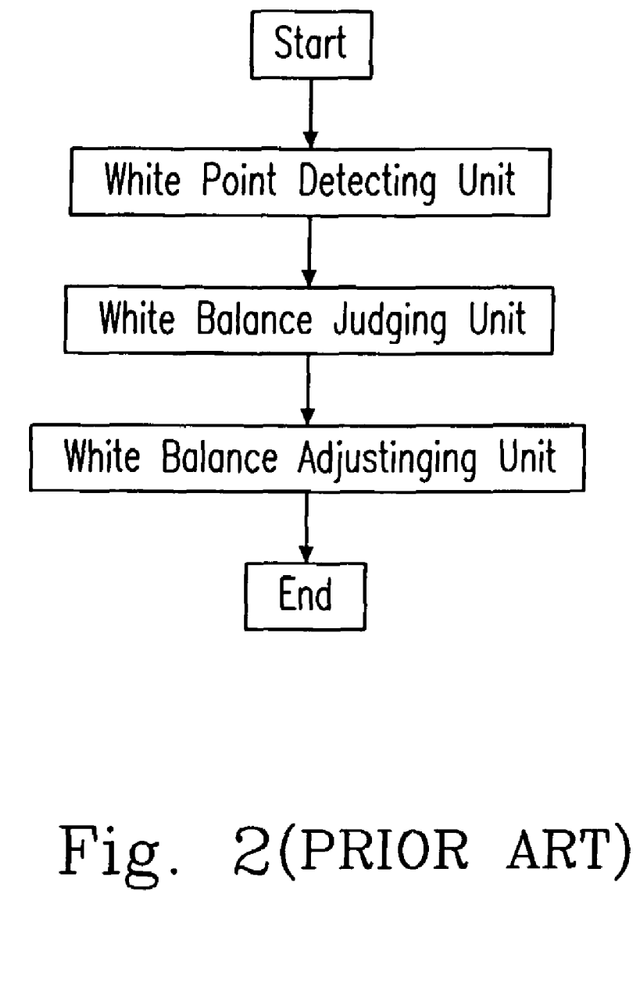
FIG. 2 is a block diagram of Chiou's white balance method.

Please refer to FIG. 2, which is a block diagram of Chiou's white balance method. CWBM is composed of three units: a white point detecting unit, a white balance judging unit and a white balance adjusting unit.

In the white point detecting unit, the reference white points are detected. Firstly, the rough reference white pixels are detected. Then the image is converted from the RGB color space to the YCrCb color space, and the pixels satisfying the Equation 1.1 are picked up.

$$\sqrt{C_r^2 + C_b^2} \leq CH_{th} \qquad (1.1)$$

The threshold value $CH_{th}$ is set in 60 in the experiment. $\sqrt{C_r^2 + C_b^2}$ is the chromaticity value.

Secondly, the pixels satisfying the Equation 1.2 among the rough reference white pixels are selected as precise reference white pixels.

$$R \geq R_{th}, G \geq G_{th}, B \geq B_{th}$$

$$|C_r| \leq AB_r, |C_b| \leq AB_b$$

$$R_l \leq C_r/C_b \leq R_u \qquad (1.2)$$

Rth, Gth, and Bth are the threshold value picked up from the eightieth percentile of each component histogram. ABr (=45), ABb (=45) are the absolute values of Cr, Cb respectively. Rl (=−1.25), Ru (=−0.75) are the lower and upper range of the Cr to Cb ratio.

Finally, the averages of rough reference white pixels and precise reference white pixels are calculated as (Rr, Gr, Br) and (Rp, Gp, Bp) respectively.

Figure 3:
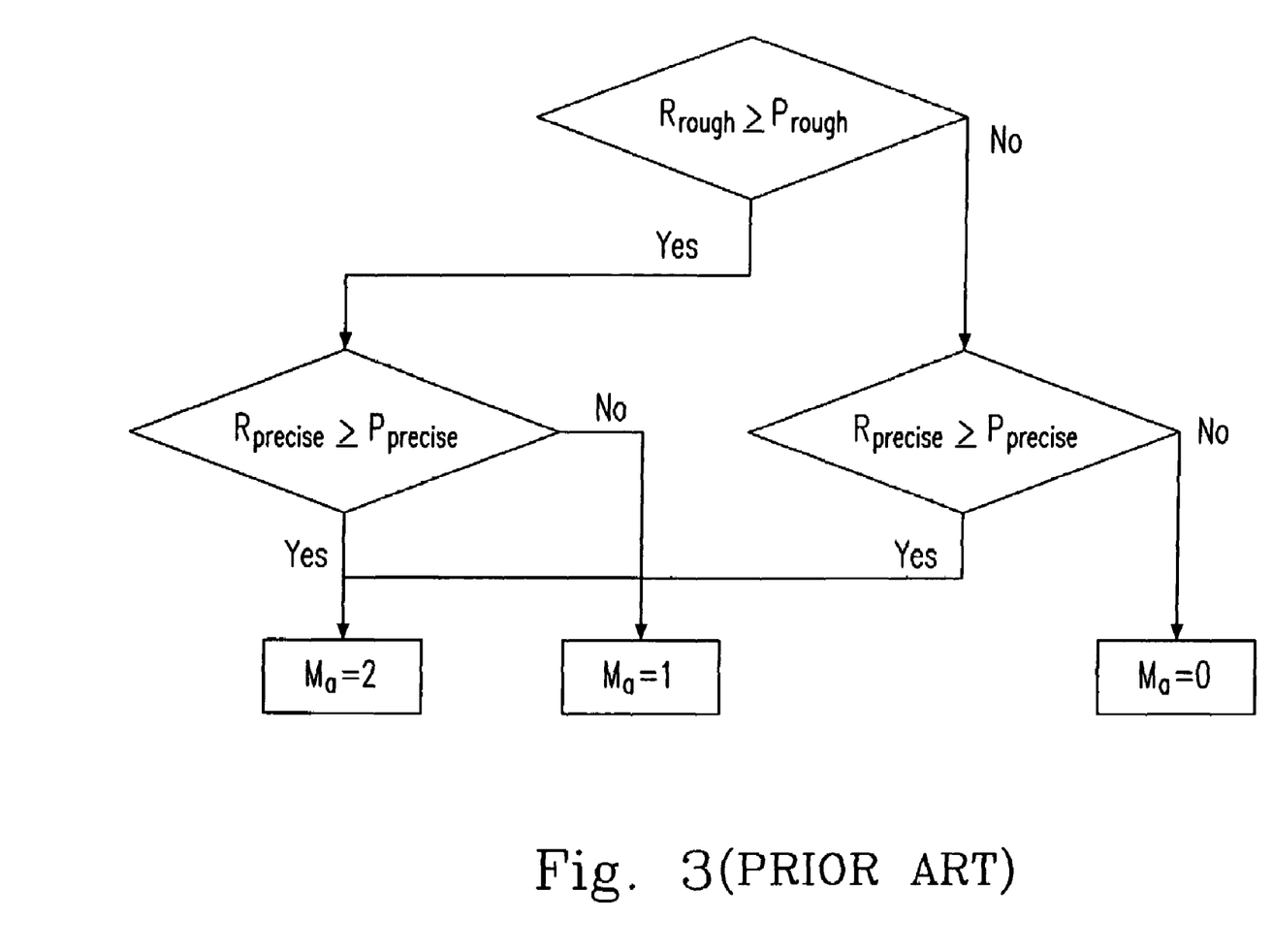
FIG. 3 is a flow chart of Chiou's white balance method.

The white balance judging unit judges whether or not to apply the white balance on the desired image then choose the reference white point data from the white point detecting unit. Firstly, Rrough and Rprecise are calculated, wherein Rrough is the ratio of rough reference white pixels to all pixels of the image and Rprecise is the ratio of precise reference white pixels to all pixels of the image. Secondly, Rrough is determined if it is greater than or equal to Rprecise and defined as a prescribed proportion, which is 0.2 in the experiment. Then Rprecise is determined if it is greater or equal to Pprecise and defined as another prescribed proportion, which is 0.05 in the experiment. Finally, a mode Ma which shows the flow of CWBM is set in the value 0, 1 and 2 as shown in FIG. 3.

The white balance adjusting unit adjusts the white balance according to the mode Ma. The rough reference white point (Rrgain, Grgain, Brgain) or the precise reference white point (Rpgain, Gpgain, Bpgain) is calculated to obtain the scale factors. If Ma is set in the value 2, then white balance is adjusted according to the precise reference white point (Rpgain, Gpgain, Bpgain). If Ma is set in the value 1, then the minors between (Rrgain, Grgain, Brgain) and (Rpgain, Gpgain, Bpgain) is chosen. However, no white balance adjustment is applied if Ma is set in the value 0.

For adjusting the extreme scale factors towards acceptable values, a sigmoid function shown in Equation 1.3 is used.

$$Y = 1.05 * (1 + \tan h(X - 1.25)) + 0.4 \qquad (1.3)$$

In Equation 1.3, X is an original scale factor and Y is an adjusted scale factor.

Although the above-mentioned GWM, PRM, FRM, and CWBA methods are provided. Some problems still can not be avoided. The most serious problem is the bad consistency of colors in the image resulting from the adjusted white balance.

It is therefore attempted by the applicant to deal with the above situation encountered in the prior art.

SUMMARY OF THE INVENTION

It is the main object of the present invention to provide an automatic white balance method for digital still cameras. The white point can be detected in extremely high accuracy with this method. Compared to the traditional methods, a better image can be formed in digital still cameras.

According to the main object of the present invention, a white balance method for an image formed by a digital still camera is provided. The white balance method comprises steps of: removing a color cast over a white object of the image; detecting a reference white point from the image by extracting an a pixel information of the white object; and adjusting a white balance of the white object by determining a scale factor based on the color cast and the pixel information.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 4:
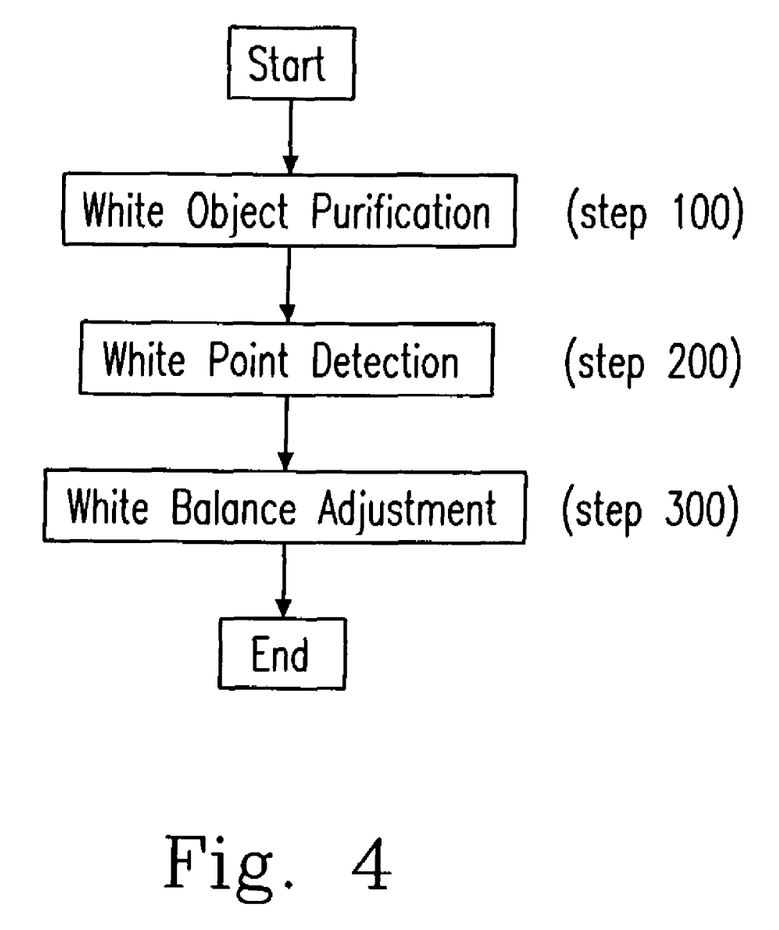
FIG. 4 is a flow chart of the automatic white balance method according to the present invention.

Please refer to FIG. 4, which is the flow chart of the automatic white balance method according to the present invention. The steps of the white balance method includes three steps: a white object purification 100, a white point detection 200 and a white balance adjustment 300. According to the observations based on the experiment, if a white object is purified, then it is easy to detect the white point from the images. For this purpose, a histogram equalization is applied on the desired image and the pixel information belonging to the white point is extracted. Then the information can be utilized to select the white point from the original image.

White Object Purification

The step of white object purification 100 purifies a white object so that a color cast over the white object is removed. By applying the histogram equalization on the RGB channels separately, the color cast over the white object can be removed. Hence the next step of white object detection 200 will become easier.

Figure 5:
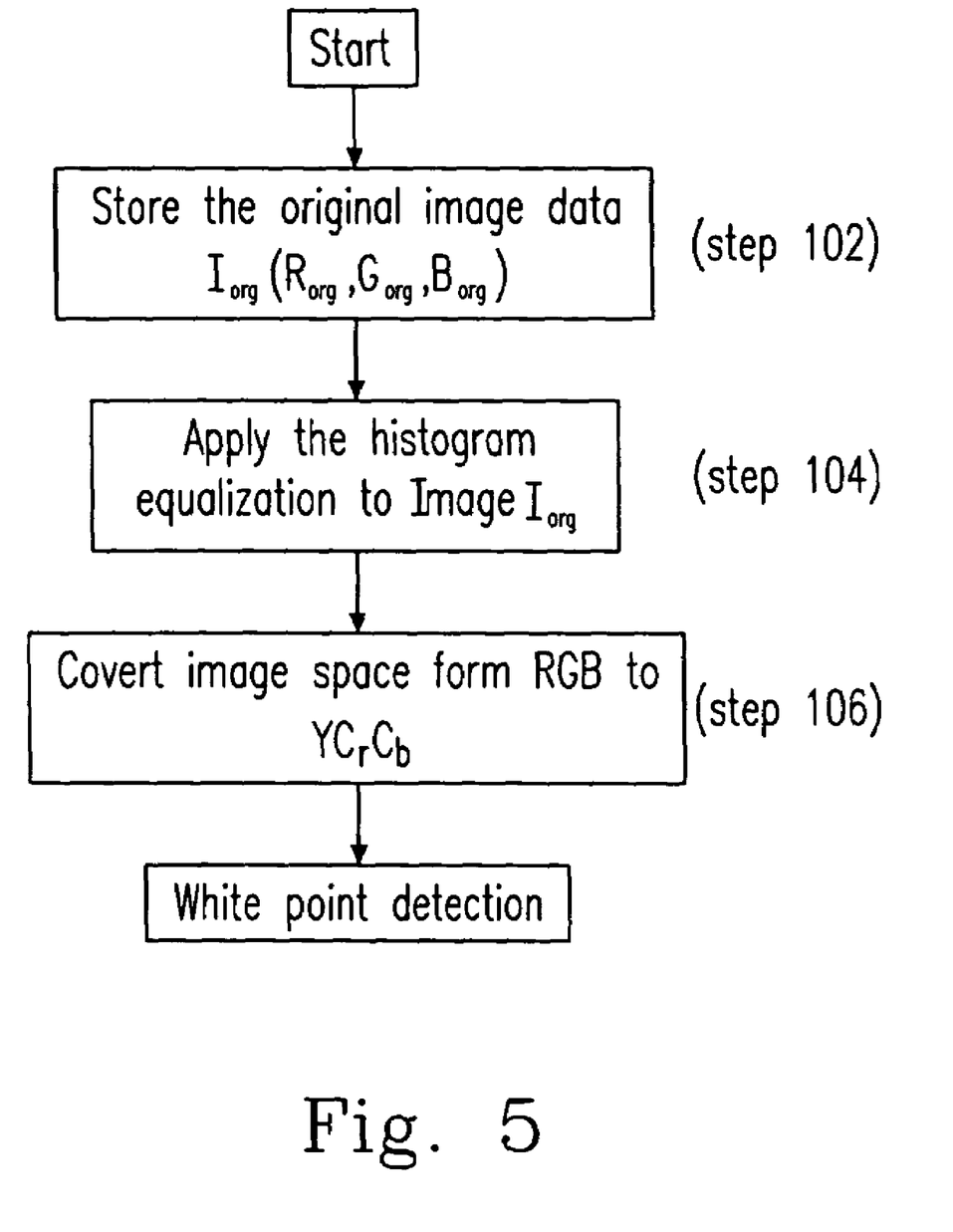
FIG. 5 is a flow chart of the step of white object purification according to the present invention.

Please refer to FIG. 5, which is the flow chart of the step of white object purification 100 according to the present invention. First, the original image data Iorg (Rorg, Gorg, Borg) is stored in step 102. Next, the histogram equalization is performed to each RGB channel in step 104. For further processing, the Histogram is applied to equalize the image data in YCrCb color space in step 106.

White Point Detection

Figure 6:
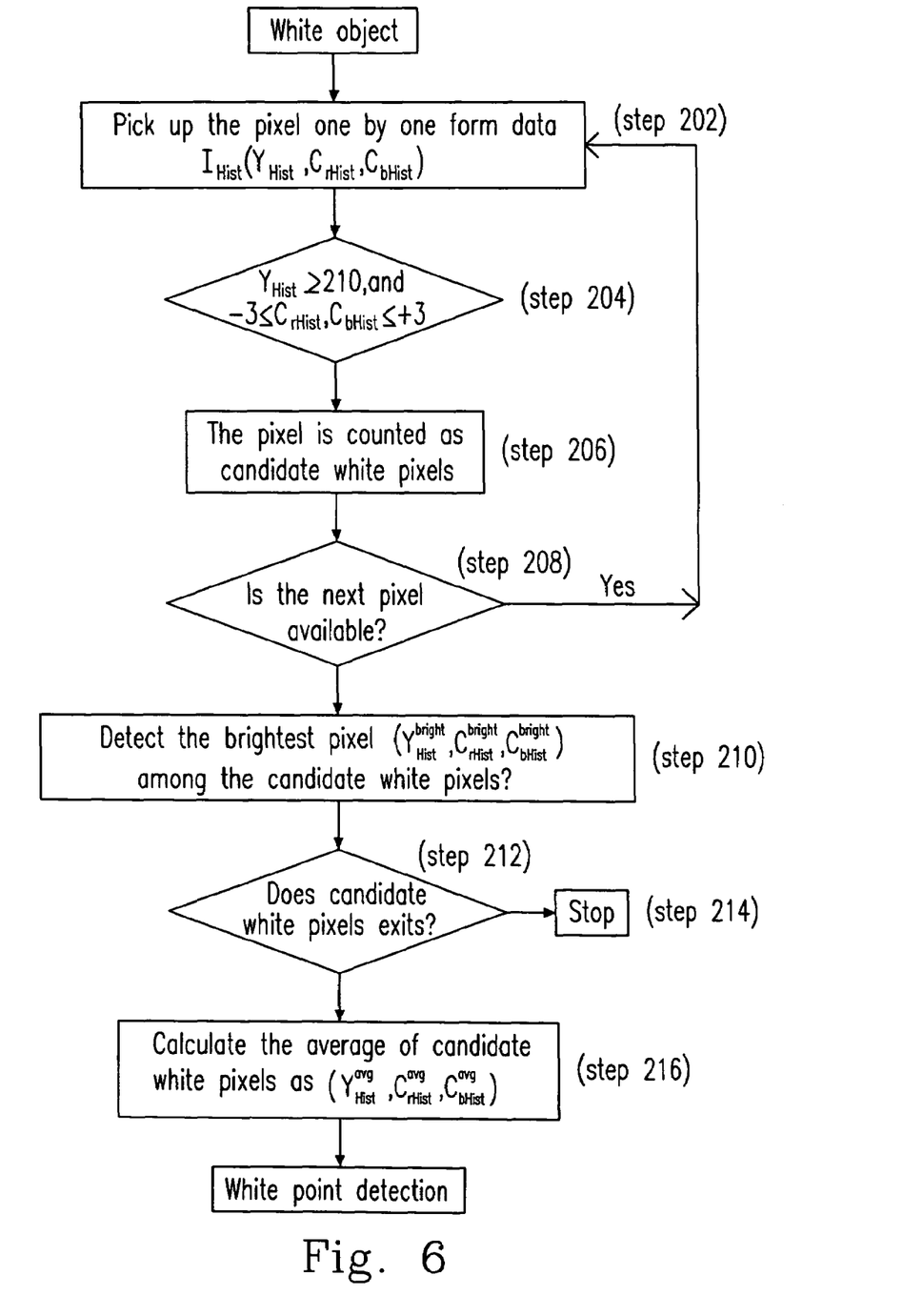
FIG. 6 is a flow chart of the step of candidate white pixels detection according to the present invention.

Please refer to FIG. 6, which is the flow chart of the step of candidate white pixels detection according to the present invention. In step 200, we make use of the histogram-equalized image data $I_{Hist}$ ($Y_{Hist}$, $C_{rHist}$, $C_{bHist}$) in YCrCb color space, which is converted from the original image data Iorg. In step 202, all pixels are picked up from the histogram-equalized image data $I_{Hist}$ one by one. Next, in step 204 and 206, the white pixels in the histogram-equalized image data $I_{Hist}$ are tested with Equation 1.4 to determine all candidate white pixels until all pixels are tested, as shown in step 208.

$$Y_{Hist} \geq 210, \text{ and}$$

$$-3 \leq C_{rHist}, C_{bHist} \leq +3 \quad (1.4)$$

In order to calculate the average of the selected candidate white pixels as $(Y_{Hist}^{avg}, C_{rHist}^{avg}, C_{bHist}^{avg})$ in step 216, a relatively brightest pixel $(Y_{Hist}^{bright}, C_{rHist}^{bright}, C_{bHist}^{bright})$ must be found out first. The relatively brightest pixel has a relatively maximum $Y_{Hist}$ value and has CrHist and CbHist values which are relatively closest to zero, as shown in step 210. The process will finally stop if no candidate white pixels are detected, as shown in step 214. In step 216, the candidate white pixels are calculated to obtain the average pixel $(Y_{Hist}^{avg}, C_{rHist}^{avg}, C_{bHist}^{avg})$.

Figure 7:
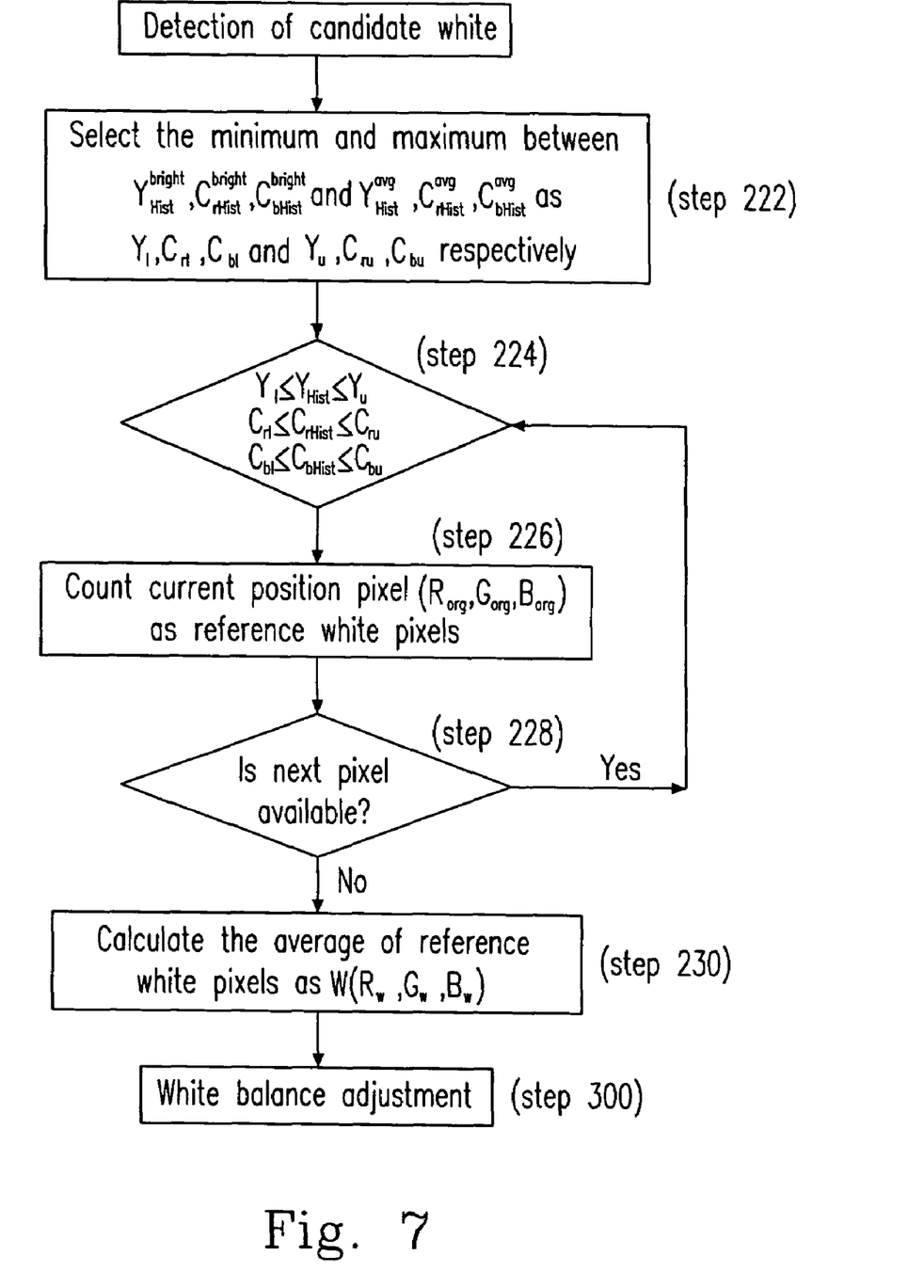
FIG. 7 is a flowchart of the step of white point detection 200.

Please refer to FIG. 7, which is the flowchart of the step of white point detection 200. After the detection of the candidate white pixels, all reference white pixels satisfying Equation 1.5 will be picked up from the histogram-equalized image data $I_{Hist}$, as shown in step 224. The rules of picking up are listed in step 222; that is, $Y_l$ and $Y_u$ are a relatively maximum value and a relatively minimum value of a range from $Y_{Hist}^{bright}$ and $Y_{Hist}^{avg}$ respectively, $C_{rl}$ and $C_{cu}$ are a relatively maximum value and a relatively minimum value of a range from $C_{rHist}^{bright}$ and $C_{rHist}^{avg}$ respectively, and $C_{bl}$ and $C_{bu}$ are a relatively maximum value and a relatively minimum value of a range from $C_{bHist}^{bright}$ and $C_{bHist}^{avg}$ respectively.

If the pixels, in step 224, from the histogram-equalized image data Iorg satisfy Equation 1.5, then select the corresponding position pixels from the original RGB color space image data as the reference white pixels as in step 226 until all pixels are determined as in step 228.

Figure 8:
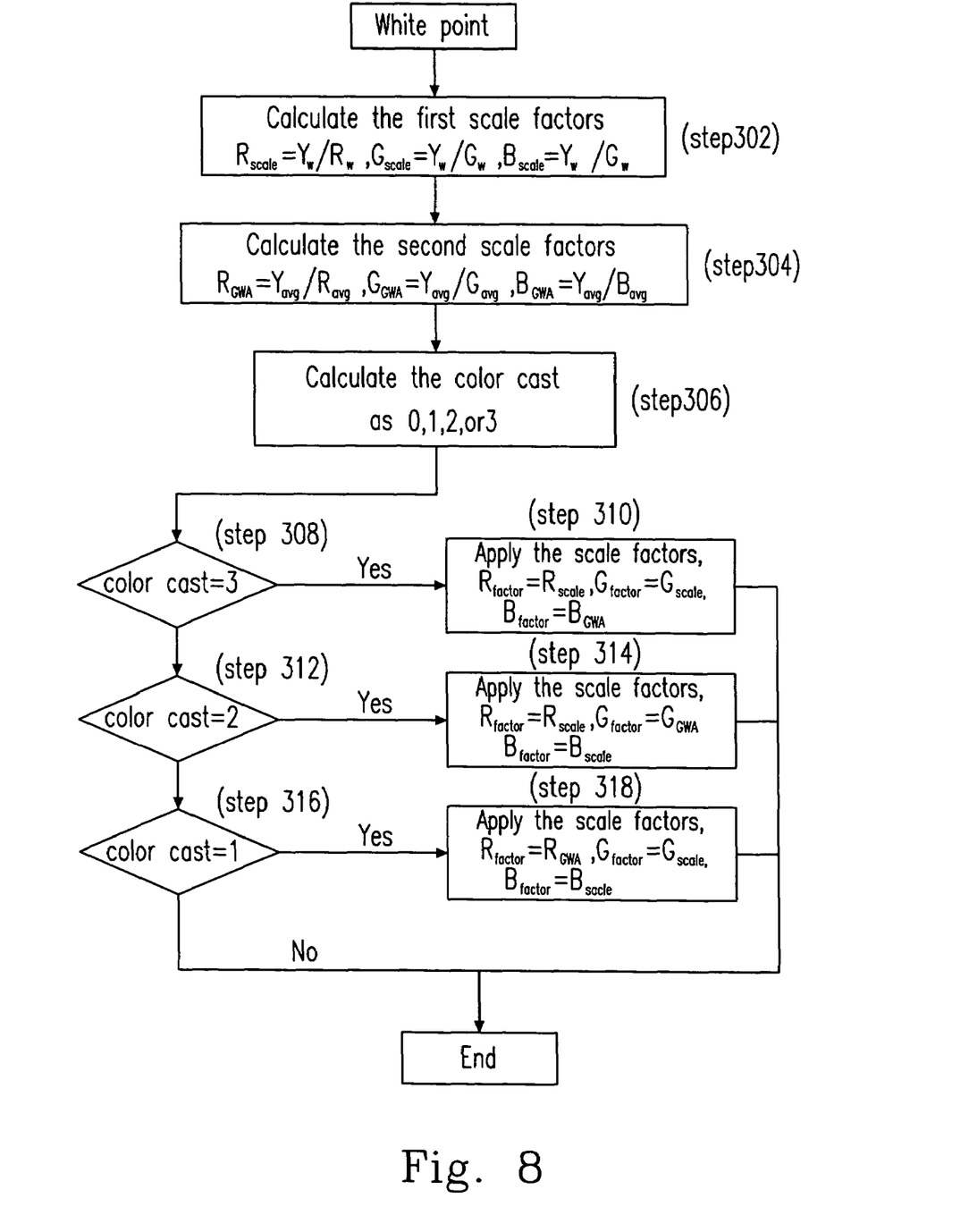
FIG. 8 is a flow chart of the step of white balance adjustment 300 according to the present invention.

Finally, in step 230 the average of those reference white pixels is calculated as $W(R_w, G_w, B_w)$. The collected white balance data are then transferred to the step of white balance adjustment 300.

White Balance Adjustment

Please refer to FIG. 8, which is the flow chart of the step of white balance adjustment 300 according to the present invention. After collecting data from the white point detection procedure 200, the white balance adjustment is then proceeded. In step 302, a first scale factor $(R_{scale}, G_{scale}, B_{scale})$ is calculated according to the reference white point $W(R_w, G_w, B_w)$ for the respective color component with Equation 1.6.

$$R_{scale} = Y_w/R_w$$

$$G_{scale} = Y_w/G_w$$

$$B_{scale} = Y_w/B_w \quad (1.6)$$

$Y_w$ is calculated with Equation 1.7.

$$Y_w = 0.299*R_w + 0.587*G_w + 0.114*B_w \quad (1.7)$$

Next, in step 304, a second scale factor $(R_{GWA}, G_{GWA}, B_{GWA})$ is calculated with Equation 1.8.

$$R_{GWA} = Y_{avg}/R_{avg}$$

$$G_{GWA} = Y_{avg}/G_{avg}$$

$$B_{GWA} = Y_{avg}/B_{avg} \quad (1.8)$$

$Y_{avg}$ is calculated with Equation 1.9.

$$Y_{avg} = 0.299*R_{avg} + 0.587*G_{avg} + 0.114*B_{avg} \quad (1.9)$$

$R_{avg}$, $G_{avg}$ and $B_{avg}$ are the average color components of the original image data $I_{org}$ ($R_{org}$, $G_{org}$, $B_{org}$) respectively.

Finally, in step 306, decisions are made for selecting the proper scale factors based on the color cast over the desired image. For determining the color cast over the image, the average values of the candidate white pixels $(Y_{Hist}^{avg}, C_{rHist}^{avg}, C_{bHist}^{avg})$ must be converted from the YCrCb color space to the RGB color space into $(R_{Hist}^{avg}, G_{Hist}^{avg}, B_{Hist}^{avg})$. Next, with Equations from 1.0 to 1.12 the bluish color cast (step 308), the greenish color cast (step 312) and the reddish color casts (step 316) can be decided respectively. Although these equations are determined by observations, it is still consistent to make use of them to find the desired color casts over the image.

$$B_{Hist}^{avg} + 3 \geq G_{Hist}^{avg} \text{ and } B_{Hist}^{avg} > R_{Hist}^{avg} \quad (1.10)$$

$$G_{Hist}^{avg} + 3 > R_{Hist}^{avg} > B_{Hist}^{avg} \quad (1.11)$$

$$R_{Hist}^{avg} > G_{Hist}^{avg} > B_{Hist}^{avg} \quad (1.12)$$

After finding the color casts, the first and second scale factors are applied. In case of the bluish cast, the scale factors are taken as Equation 1.13 shows. That is, the first scale factor gives the R component and the G component. The second scale factor gives the B component. The color cast is 3 as steps 308 and 310 show.

$$R_{factor} = R_{scale}$$

$$G_{factor} = G_{scale}$$

$$B_{factor} = B_{GWA} \quad (1.13)$$

In case of the greenish cast, the scale factors are taken as Equation 1.14 shows. That is, the first scale factor gives the R component and the B component. The second scale factor gives the G component. The color cast is 2 as steps 312 and 314 show.

$$R_{factor} = R_{scale}$$

$$G_{factor} = G_{GWA}$$

$$B_{factor} = B_{Scale} \quad (1.14)$$

In case of the reddish cast, the scale factors are taken as Equation 1.15 shows. That is, the first scale factor gives the G component and the B component. The second scale factor gives the R component. The color cast is 1 as steps 316 and 318 show.

$$R_{factor} = R_{GWA}$$

$$G_{factor} = G_{scale}$$

$$B_{factor} = B_{scale} \quad (1.15)$$

With the color cast, the white balance of the image can be achieved accurately. An image of consistent colors is then shown on the digital still camera.

According to the prior arts, the above-mentioned GWM, PRM, FRM and CWBA methods can not avoid some serious problems, especially the destroyed consistency of colors in the image while white balance is proceeding. The present invention utilizes the color cast finding equations and, in some conditions, makes the decisions of rejections. With or without applying white balance adjustment, the present invention can avoid those problems. Besides, in some situations, such as a greenhouse, applying any white balance algorithm may result in the bluish color cast instead of the removeof the original color cast. The present invention also gets rid of such problems. Under natural light sources and household lights the present invention performs extremely well.

The experimental results of the present invention show the best performance in the applications of both objectives and subjective evaluations. Experiments also show the stability of the present invention in removing the color cast over the scene under object-varying situations. Besides, the light-varying conditions are also considered by capturing the same scene under different light sources and the results remains stable. The present invention is applicable to the white balance about the so-called moving pictures. With reference to the white balance of a single brightest pixel, which is still the main drawback of PRM method, the present invention also overcome it. By the use of some range with which the step of finding the brightest pixel is performed, the detected brightest pixel will always belong to the white color. The present invention works under all possible situations because of the brightest pixel is used for finding the range to detect the white pixels under the color cast. In sum, the present invention either removes the color cast completely or stops for white balance adjustment. Complexity of the present invention is also acceptable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A white balance method for an image formed by a digital still camera, comprising steps of:
   (a) removing a color cast over a white object of said image, wherein the step (a) includes sub-steps of:
      storing an original image data $I_{org}$ ($R_{org}$, $G_{org}$, $B_{org}$) of said image;
      performing a histogram equalization for said original image data $I_{org}$; and
      converting said original image data $I_{org}$ from an RGB color space to a $YC_rC_b$ color space so as to obtain a histogram-equalized image data $I_{Hist}$ ($Y_{Hist}$, $C_{rHist}$, $C_{bHist}$);
   (b) detecting a reference white point from said image by extracting a pixel information of said white object, wherein the step (b) includes sub-steps of:
      determining all candidate white pixels from said histogram-equalized image data $I_{Hist}$ with an equation (1):

$Y_{Hist} \geq 210$, and $$-3 \leq C_{rHist}, C_{bHist} \leq +3 \quad (1);$$

obtaining a relatively brightest pixel ($Y_{Hist}^{bright}$, $C_{rHist}^{bright}$, $C_{bHist}^{bright}$) from said candidate white pixels, wherein said relatively brightest pixel has a relatively maximum $Y_{Hist}$ value and has $C_{rHist}$ and $C_{bHist}$ values being relatively closest to zero;
      calculating an average pixel ($Y_{Hist}^{avg}$, $C_{rHist}^{avg}$, $C_{bHist}^{avg}$) of said candidate white pixels;
      determining all reference white pixels from said RGB color space if corresponding pixels thereof from said histogram-equalized image data $I_{Hist}$ satisfy equation (2):

$Y_l \leq Y_{Hist} \leq Y_u$ $C_{rl} \leq C_{rHist} \leq C_{ru}$ $$C_{bl} \leq C_{bHist} \leq C_{bu} \quad (2),$$

wherein $Y_l$ and $Y_u$ are a relatively maximum value and a relatively minimum value of said $Y_{Hist}^{bright}$ and said $Y_{Hist}^{avg}$ respectively, $C_{rl}$ and $C_{cu}$ are a relatively maximum value and a relatively minimum value of said $C_{rHist}^{bright}$ and said $C_{rHist}^{avg}$ respectively, and $C_{bl}$ and $C_{bu}$ are a relatively maximum value and a relatively minimum value of said $C_{bHist}^{bright}$ and said $C_{bHist}^{avg}$ respectively; and
      calculating an average $W(R_w, G_w, B_w)$ of said reference white pixels as said pixel information; and
   (c) adjusting a white balance of said white object by determining a scale factor based on said color cast and said pixel information.

2. The white balance method according to claim 1, wherein said step (c) further comprises steps of:
   calculating a first scale factor ($R_{scale}$, $G_{scale}$, $B_{scale}$) from said average $W(R_w, G_w, B_w)$ of said reference white pixels with equations (3) and (4):

$R_{scale} = Y_w/R_w$ $G_{scale} = Y_w/G_w$ $$B_{scale} = Y_w/B_w \quad (3)$$

$$Y_w = 0.299*R_w + 0.587*G_w + 0.114*B_w \quad (4); \text{ and}$$

calculating a second scale factor ($R_{GWA}$, $G_{GWA}$, $B_{GWA}$) with equations (5) and (6):

$R_{GWA} = Y_{avg}/R_{avg}$ $G_{GWA} = Y_{avg}/G_{avg}$ $$B_{GWA} = Y_{avg}/B_{avg} \quad (5)$$

$$Y_{avg} = 0.299*R_{avg} + 0.587*G_{avg} + 0.114*B_{avg} \quad (6),$$

wherein $R_{avg}$, $G_{avg}$, and $B_{avg}$ are average color components of said original image data $I_{org}$ ($R_{org}$, $G_{org}$, $B_{org}$), respectively.

3. The white balance method according to claim 2, further comprising steps of:
   determining said color cast as being bluish if $B_{Hist}^{avg} + 3 \geq G_{Hist}^{avg}$ and $B_{Hist}^{avg} > R_{Hist}^{avg}$, wherein ($R_{Hist}^{avg}$, $G_{Hist}^{avg}$, $B_{Hist}^{avg}$) is obtained by converting said average pixel ($Y_{Hist}^{avg}$, $C_{rHist}^{avg}$, $C_{bHist}^{avg}$) of said candidate white pixels from said $YC_rC_b$ color space to said RGB color space; and
   taking ($R_{scale}$, $G_{scale}$, $B_{GWA}$) as said scale factor.

4. The white balance method according to claim 2, further comprising steps of:
   determining said color cast as being reddish if $G_{Hist}^{avg} + 3 > R_{Hist}^{avg} > B_{Hist}^{avg}$, wherein ($R_{Hist}^{avg}$, $G_{Hist}^{avg}$, $B_{Hist}^{avg}$) is obtained by converting said average pixel ($Y_{Hist}^{avg}$, $C_{rHist}^{avg}$, $C_{bHist}^{avg}$) of said candidate white pixels from said $YC_rC_b$ color space to said RGB color space; and
   taking ($R_{GWA}$, $G_{scale}$, $B_{scale}$) as said scale factor.

5. The white balance method according to claim 2, further comprising steps of:
   determining said color cast as being greenish if $R_{Hist}^{avg} > G_{Hist}^{avg} > B_{Hist}^{avg}$, wherein ($R_{Hist}^{avg}$, $G_{Hist}^{avg}$, $B_{Hist}^{avg}$) is obtained by converting said average pixel ($Y_{Hist}^{avg}$, $C_{rHist}^{avg}$, $C_{Hist}^{avg}$) of said candidate white pixels from said $YC_rC_b$ color space to said RGB color space; and
   taking ($R_{scale}$, $G_{GWA}$, $B_{scale}$) as said scale factor.

* * * * *